United States Patent
Ovsiannikov et al.

(10) Patent No.: US 7,456,884 B2
(45) Date of Patent: Nov. 25, 2008

(54) METHOD AND CIRCUIT FOR DETERMINING THE RESPONSE CURVE KNEE POINT IN ACTIVE PIXEL IMAGE SENSORS WITH EXTENDED DYNAMIC RANGE

(75) Inventors: Ilia Ovsiannikov, Studio City, CA (US); Kwang-Bo Cho, Los Angeles, CA (US); Michael Kaplinsky, South Pasadena, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 736 days.

(21) Appl. No.: 10/633,673

(22) Filed: Aug. 5, 2003

(65) Prior Publication Data

US 2005/0030401 A1 Feb. 10, 2005

(51) Int. Cl.
*H04N 5/335* (2006.01)
*H04N 5/217* (2006.01)

(52) U.S. Cl. ...................................... 348/308; 348/241
(58) Field of Classification Search ................ 348/308, 348/241, 222.1
See application file for complete search history.

(56) References Cited

U.S. PATENT DOCUMENTS

| | | | |
|---|---|---|---|
| 5,912,463 A * | 6/1999 | Mizuno et al. | 250/338.1 |
| 6,008,486 A | 12/1999 | Stam et al. | |
| 6,040,570 A | 3/2000 | Levine et al. | |
| 6,130,713 A | 10/2000 | Merrill | |
| 6,248,991 B1 | 6/2001 | Chen et al. | |
| 6,348,681 B1 | 2/2002 | Kindt et al. | |
| 6,501,064 B2 * | 12/2002 | Kole | 250/208.1 |
| 6,727,946 B1 * | 4/2004 | Zhao et al. | 348/308 |
| 2002/0036700 A1 * | 3/2002 | Merrill | 348/308 |
| 2003/0146993 A1 * | 8/2003 | Kokubun et al. | 348/308 |

OTHER PUBLICATIONS

Steven Decker et al., "A 256×256 CMOS Imaging Array with Wide Dynamic Range Pixels and Column-Parallel Digital Output", IEEE Journal of Solid-State Circuits, vol. 33, No. 12, Dec. 1998, pp. 2081-2091.
David X.D. Yang et al., "A 640×512 Image Sensor with Ultra Wide Dynamic Range Floating-Point Pixel-Level ADC", Electrical Engineering Department, Stanford University, Stanford, CA, Session No. 17, Nov. 1, 1998, pp. 1-11.

* cited by examiner

*Primary Examiner*—David Ometz
*Assistant Examiner*—Nicholas G Giles
(74) *Attorney, Agent, or Firm*—Dickstein Shapiro LLP

(57) ABSTRACT

An apparatus and method for measuring the breakpoint of a response curve representing the voltage output of an image array having an extended dynamic range. By flooding a light-opaque pixel with a charge and then applying an intermediate reset voltage to the pixel, the signal is read from the pixel and stored. The full reset voltage is applied to the pixel, and then the signal in the pixel is read and stored. The voltage output difference is the difference between the first and second stored signal. The voltage output difference is then used to determine the voltage of the knee point. Further, a conventional saturated pixel can be reset with an intermediate reset just prior to readout. The resulting signal can then be used to determine the voltage of the knee point.

25 Claims, 12 Drawing Sheets

METHOD AND CIRCUIT FOR DETERMINING THE RESPONSE CURVE KNEE POINT IN ACTIVE PIXEL IMAGE SENSORS WITH EXTENDED DYNAMIC RANGE

The present invention relates generally to imager array operation, and more specifically, to circuits and methods for changing the dynamic range of an imager array.

BACKGROUND OF THE INVENTION

There is a current interest in CMOS active pixel imagers for use as low cost imaging devices. FIG. 1 shows a conventional CMOS active pixel sensor imager array circuit 100 including a pixel array 110 and associated circuitry. Circuit 100 includes an array 110 of pixels 150 and a row decoding/controlling circuit 130 and a column address/decoding/readout circuit 120 which provide timing and control signals to enable reading out of signals stored in the pixels 150 in a manner commonly known. The array 110 has columns 149 and rows 147 of pixels 150. Exemplary arrays 110 have dimensions of M times N pixels 150, with the size of the array 110 depending on a particular application. The imager 100 is read out a row 147 at a time using a column parallel readout architecture. The row circuit 130 selects a particular row 147 of pixels 150 in the array 110 by controlling the operation of row addressing and row drivers (not shown) within the row circuit 130. Charge integration signals stored in the selected row of pixels 150 are provided on the column lines 170 to a column circuit 120, in a manner described below, and sampled and stored in column buffer circuits 151. The pair of signals corresponding to the read out reset signal and integrated charge signal (e.g., Vrst, Vsig) are provided by the column buffer circuits 151 to a differential amplifier circuit 154. The differential amplifier circuit 154 provides the differential output of the pixel signals (e.g., Vrst, Vsig) to the analog-to-digital (ADC) circuit 156. The ADC circuit 156 provides a digital value representing the signal of the pixel 150 output to associated circuitry 199. Associated circuitry 199 is representative of the many circuits that receive the input from the ADC circuit 156 and perform operations on the input. For example, associated circuitry 199, may store, transfer to a bus/memory, and perform linear/non-linear operations on the signal input.

A pixel 150 of the CMOS active pixel sensor imager array 100 is shown in greater detail in FIG. 2. Pixel 150 can have one or more active transistors within the pixel unit cell, can be made compatible with CMOS technologies, and promises higher readout rates compared to passive pixel sensors. The FIG. 2 pixel 150 is a 3T APS, where the 3T is commonly used in the art to designate use of three transistors to operate the pixel. A 3T pixel has a photodiode 162, a reset transistor 184, a source follower transistor 186, and a row select transistor 188. It should be understood that while FIG. 2 shows the circuitry for operation of a single pixel 150, in practical use there will be an M times N array of identical pixels 150 arranged in rows and columns with the pixels 150 of the array accessed using row and column select circuitry, as described above.

The photodiode 162 converts incident photons to electrons which collect at node A. A source follower transistor 186 has its gate connected to node A and amplifies the signal appearing at node A. When a particular row-containing cell 150 is selected by a row selection transistor 188, the signal amplified by transistor 186 is passed on a column line 170 to the readout circuitry. The photodiode 162 accumulates a photo-generated charge in a doped region of the substrate. It should be understood that the pixel 150 might include a photogate or other photoconversion device, in lieu of a photodiode, for producing photo-generated charge.

A reset voltage source Vrst, typically Vaa, on line 195 is selectively coupled through reset transistor 184 to node A. The row select control line 160 is coupled to all of the pixels 150 of the same row of the array. Voltage source Vaa is coupled to a source following transistor 186 and its output is selectively coupled to a column line 170 through row select transistor 188. Although not shown in FIG. 1, column line 170 is coupled to all of the pixels of the same column of the array and typically has a current sink at its lower end. The gate of row select transistor 188 is coupled to row select control line 160.

The gate of reset transistor 184 is coupled to reset control circuit 180 through reset control line 191. Reset control circuit 180 serves to control the reset operation in which Vrst is coupled to node A. Reset control circuit 180 may provide a plurality of control signals to the reset transistor 184, e.g., the reset control circuit 180 provides a full and an intermediate reset signal to reset transistor 184. Reset control circuit 180 is mutually coupled to the reset transistor 184 of each pixel 150 in the row 147. Each row 147 of pixels 150 has an associated reset control circuit 180.

As known in the art, a value is read from pixel 150 in a two-step process. During a charge integration period, the photodiode 162 converts photons to electrons which collect at the node A. The charges at node A are amplified by source follower transistor 186 and selectively passed to column line 170 by row access transistor 188. During a reset period, node A is reset by turning on reset transistor 184 and the reset voltage is applied to node A and read out to column line 170 by the source follower transistor 186 through the activated row select transistor 188. As a result, the two different values—the reset voltage Vrst and the image signal voltage Vsig—are readout from the pixel and sent by the column line 170 to the readout circuitry where each is sampled and held for further processing as known in the art.

FIG. 3 more clearly shows the column buffer circuit 151 of FIG. 1 that is capable of sampling and holding and then providing two sampled values, e.g., Vsig and Vrst values, for subsequent use by a down stream circuit (FIG. 1). As seen in FIG. 3 the column line 170 is switchably coupled through SH_R switch 310 to the first side of capacitor 318. The second side of capacitor 318 is switchably coupled through switch 326 to a downstream circuit. The column line 170 is also switchably coupled through SH_S switch 310 to the first side of capacitor 320. The second side of capacitor 320 is switchably coupled through switch 328 to a downstream circuit. The first side of capacitor 318 is switchably coupled through switch 313 to the first side of capacitor 320. A clamp voltage Vcl is switchably coupled through switch 315 to the second side of capacitor 318. A clamp voltage Vcl is also switchably coupled through switch 317 to the second side of capacitor 320.

The conventional CMOS imager array 100 (FIG. 1) has a limited dynamic range and is prone to over-saturation from receiving a very high light intensity. As is known in the art, the dynamic range of a pixel array can be increased by implementation of an extended dynamic range (XDR) technique, where a modified reset signal is applied to the gate of the reset transistor. The modified reset signal, referred to as an intermediate reset value, has a different, typically smaller, amplitude than the "full reset" signal asserted at the start of each integration period. The intermediate reset value will affect only those cells on which a strong light signal is incident.

Only if a photocurrent has reduced the voltage across a cell's photodiode to below a certain level at the time the intermediate reset value is asserted, then the voltage across the photodiode will be pulled up to Vdac=Vxdr−Vth, where Vxdr is the voltage, i.e., of the intermediate voltage, on the reset line 191 (FIG. 2) and Vth is the threshold voltage of the reset transistor (e.g., reset transistor 184 of FIG. 2). In accordance with the XDR technique, during each integration period, the intermediate reset value is applied to the gate of each of the reset transistors in the row.

FIG. 4 depicts a Vadc output of an upstream pixel from an imager system when the XDR technique is applied. By applying an intermediate reset value during the integration period, the response curve of the image sensor is converted from a linear curve to a piecewise linear curve, as illustrated in FIG. 4.

The vertical axis of FIG. 4 represents digital data output from circuit 156 (FIG. 1), i.e., an ADC amplifier 156, as a result of a read of an upstream pixel 150 of the imager 100 (FIG. 1). The Vzero 411 axis represents a zero ("0") Vadc output. The Vadc_break 413 axis represents a Vadc output of the kneepoint (e.g., the break point). The Vadc_max 417 axis represents a maximum Vadc output of a pixel 150, e.g., the saturation point. The horizontal axis in FIG. 4 represents incident light intensity on the cell during the integration period. The Lzero 401 axis represents a zero ("0") light intensity output. The Lbreak 403 axis represents a light intensity output of the kneepoint. The Lno_XDR 405 axis represents a maximum light intensity output of a pixel 150 if an XDR technique is not applied, e.g., the saturation point of the pixel without an extended dynamic range. The LXDR 407 axis represents a maximum light intensity output of a pixel 150 if an XDR technique is applied, e.g., the saturation point of the pixel with an extended dynamic range.

Curve 410 represents the response curve of pixel 150 (FIG. 1), indicating the range of detectable incident light intensity (from Lzero 401 to Lno_XDR 405) corresponding to the full range of the output of ADC amplifier 156 (FIG. 1), from Vzero 411 to Vadc_max 417, when no intermediate reset signal is asserted during the integration period. Curve 420 of FIG. 4 represents the response curve of the pixel 150, indicating the extended range of detectable incident light intensity (from Lzero 401 to LXDR 407, where intensity LXDR 407 is greater than Lno_XDR) corresponding to the full range of the output of ADC amplifier 156, when an intermediate reset signal is asserted during the integration period. The break point 430 represents the change in the response of pixel 150 to light intensity after an intermediate pulse signal is provided, i.e., after the XDR technique is applied. At breakpoint 430, the response curve changes from the non-extended range light intensity curve 410 to the extended range light intensity curve 420.

FIG. 4 illustrates how the XDR technique extends the dynamic range of the image sensor, namely by increasing the maximum detectable light intensity from Lno_XDR 405 to LXDR 407. The coordinates of the breakpoint (403, 413) depend on the photodiode voltage immediately after an XDR reset (Vdac=Vxdr−Vth) and the time at which the XDR reset is performed during the integration period. It is possible to perform two or more intermediate resets in a single integration period, which results in a piecewise linear sensor response curve having N+1 linear sections, and N breakpoints (one breakpoint for each of N intermediate resets), and can (in some cases) increase the dynamic range beyond that achievable with only one intermediate reset per integration period.

When implementing the XDR technique, the voltage supplied to the reset line 191 (FIG. 2) can be generated using a DAC (digital-to-analog converter). The imager 100 (FIG. 1) can be programmed with a desired intermediate voltage level and the time at which each XDR reset is performed.

FIG. 5 illustrates how the XDR technique affects the digital output from an ADC circuit 156 (FIG. 1) of an upstream pixel cell 150 over time. The vertical axis of FIG. 5 represents voltage data output from circuit 156 (FIG. 1), i.e., an ADC amplifier 156, as a result of a read of an upstream pixel 150 of the circuit 100 (FIG. 1).

The Vzero 511 axis represents a zero ("0") Vadc output. The Vadc_break 515 axis represents a Vadc output of the kneepoint. The Vadc_max 517 axis represents a maximum Vadc output of a pixel 150, e.g., the saturation point.

The horizontal axis in FIG. 5 represents time. The Tzero 501 axis represents time zero ("0"). The time Trst 503 axis represents the time of the kneepoint, e.g., the time that the intermediate reset voltage is applied. The time Tint 507 axis represents the total integration time of a pixel 150, regardless whether a XDR technique is applied, e.g., the saturation point of the pixel with an extended dynamic range.

Curve 550 represents the response curve of pixel 150 (FIG. 1) when the XDR mode is disabled and the intermediate reset is not applied. The slope of curve 550 (i.e., dV/dt) is proportional to the photocurrent of pixel 150 and the intensity of light incident on pixel 150. As drawn, curve 550 corresponds to the maximum light intensity that can be sensed by pixel 150 without saturation when XDR is off, Imax_noxdr. Any curve with a steeper slope, like curve 510, will cause the output of pixel 150 to saturate at Vadc_max 517.

Curves 510 and 520 represent the response curve of pixel 150 when the XDR mode is enabled. Any pixel 150 receiving more light than that represented by curve 540 will be affected by the intermediate reset. While a fill reset would cause integration to restart from Vzero, the intermediate reset restarts integration from Vadc_intrst 513 and continues for a duration of (Tint−Trst). During this second period of integration the maximum light intensity that will not cause pixel saturation is represented by the slope of curve 520, Imax_xdr.

Curve 510 represents the response curve of pixel 150 (FIG. 1) indicating the range of time (from Tzero 501 to Trst 503) corresponding to the full range of the output of the ADC amplifier 156 (from Vzero 511 to Tint 517), when no intermediate reset signal is asserted during the integration period. Curve 520 of FIG. 5 represents the response curve of pixel 150, indicating the extended range of time, Tint (from Trst 503 to Tint 507, where Tint 507 is greater than Trst 503) corresponding to the full range of output of the ADC amplifier 156 when an intermediate reset signal is asserted during the integration period at the breakpoint time period Trst 503.

Point 530 shows that, upon application of the intermediate reset signal, the response of pixel 150 to photon integration changes. At time period 503, the response curve changes from the non-extended range voltage output curve 510 to the extended range voltage output curve 520. The Vadc_instr 513 represents the change in Vrst that is provided, i.e., the full reset value offset by the intermediate reset value.

FIG. 5 illustrates how the XDR technique extends the dynamic range of the image sensor, namely by increasing the maximum amount of exposure for the pixel 150 without causing the signal from the pixel 150 being over saturated.

A pixel array with an XDR system can be programmed to provide a desired kneepoint by specifying the desired Trst (i.e., intermediate reset time) and intermediate reset voltage Vrst. However, within sensor circuitry are inherent sources of variation affecting absolute signal magnitudes. Although a XDR system is designed to provide intermediate and full reset voltages, process variation can affect the provided voltage, resulting in actual intermediate and full reset voltages, which are different from the desired intermediate and full reset voltages. Therefore, the desired knee point may differ from the actual knee point.

The knee point corresponds to the time when the intermediate reset voltage is applied and the voltage output from the pixel at the break point, i.e., Vadc_break. The knee point can be determined by first determining the difference between the full reset voltage and the intermediate reset, i.e., ΔVrst. Since values of Trst and Tint are pre-determined, Vadc_break can be calculated once ΔVrst is determined, where:

$$Vadc\_break = (Tint/Trst) * \Delta Vrst \qquad (1).$$

However, it is unknown how to determine the actual difference between the full reset voltage and the intermediate reset, i.e., ΔVrst. Consequently, it is not been known how to determine the actual knee point of the response curve. Thus, it would be desirable to be able to determine the actual knee point of the response curve.

SUMMARY OF THE INVENTION

The present invention provides a method and apparatus for determining the knee point of a response curve of an image array applying an extended dynamic range technique.

In a first exemplary embodiment, the knee point is determined by first flooding the pixel artificially by coupling the light sensitive node pixel to ground. Then an intermediate reset voltage is applied to the pixel and the signal in the pixel is sampled and held. Subsequently, a full reset voltage is applied to the pixel, and the signal in the pixel sampled and held. Using the two signals from the pixel, the difference between the intermediate and full reset value is determined. The pixel is either light opaque or shielded from incident light.

In another exemplary embodiment, the knee point is determined by sampling and storing the signal values from the image array without applying the XDR technique. The signal values of saturated pixels are recorded. Then, the image array is sampled and stored applying the XDR technique, where the intermediate reset voltage is applied at a time Trst, where Trst is substantially equivalent to Tint. The difference between the intermediate and full reset value is determined by comparing the difference between the signal values of saturated pixels from the initial readout of the pixel array and the signal values of the corresponding pixels from the subsequent readout of the pixel array.

BRIEF DESCRIPTION OF THE DRAWINGS

These and other features and advantages of the invention will be more readily understood from the following detailed description of the invention which is provided in connection with the accompanying drawings, in which.

DETAILED DESCRIPTION OF THE INVENTION

Figure 1:
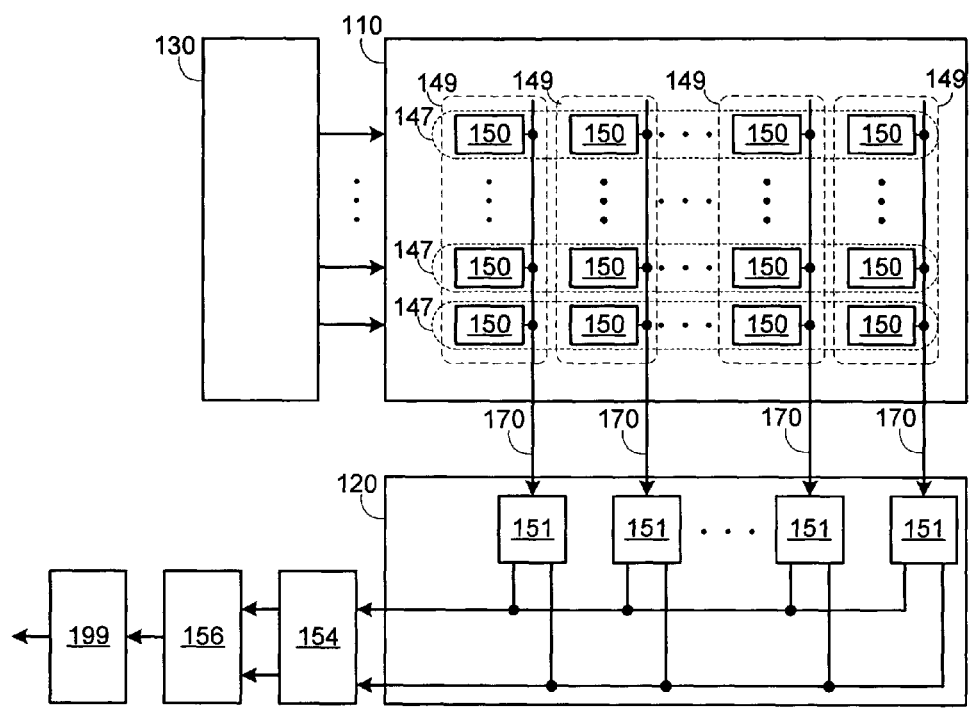
FIG. 1 is a block diagram of a conventional CMOS image array and associated circuitry.
Figure 2:
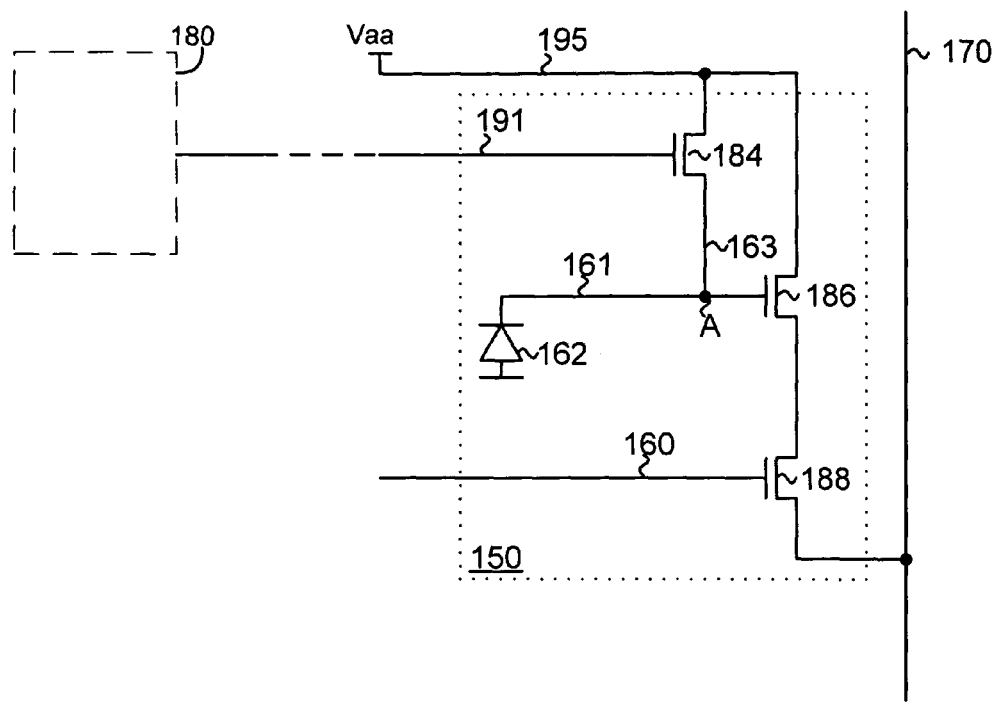
FIG. 2 is a block diagram of a conventional three transistor pixel cell of the FIG. 1 CMOS image array.
Figure 6:
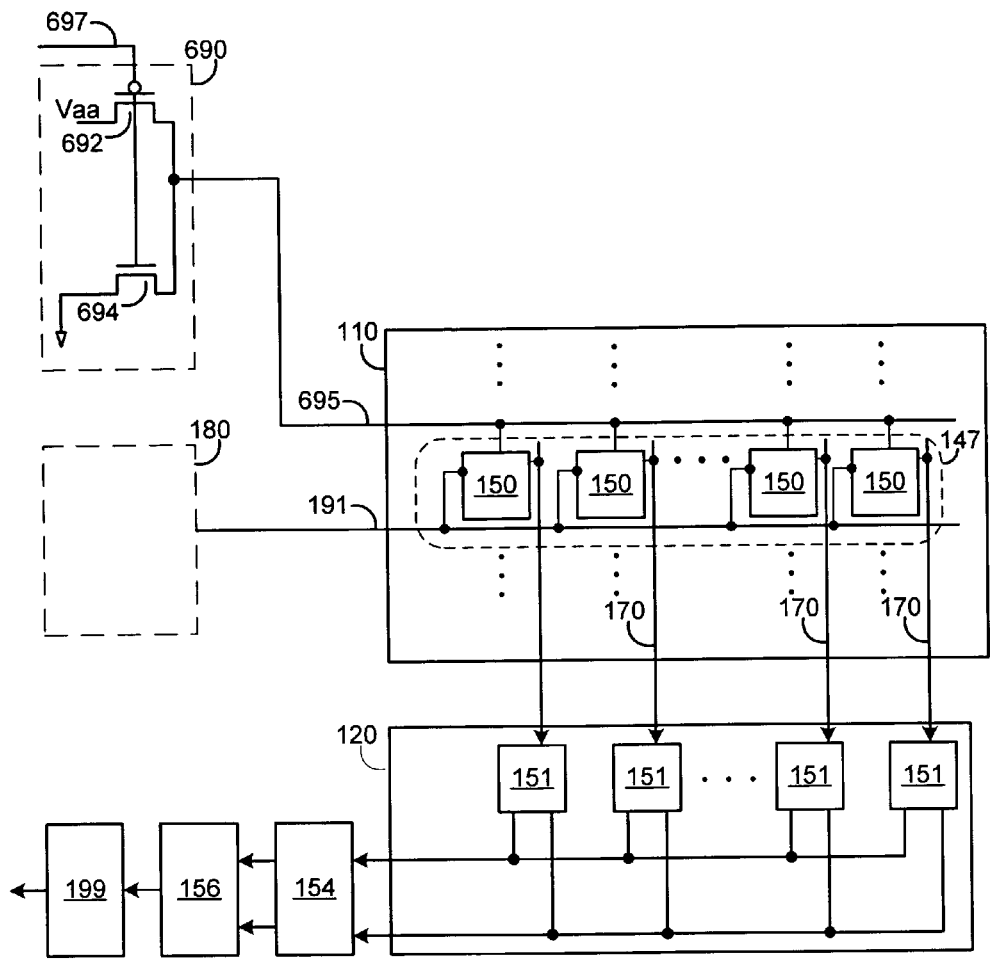
FIG. 6 is a block diagram of a CMOS image array and associated circuitry in accordance with an exemplary embodiment of the invention.

FIG. 6 depicts a CMOS active pixel sensor imager array circuit 600 including associated circuitry according to an exemplary embodiment of the present invention. Circuit 600 differs from circuit 100 in that circuit 600 includes a power supply circuit 690. Power supply circuit 690 mutually couples line 695 either to a reset voltage Vaa or to ground. Power supply circuit 690 is mutually coupled to the reset transistor 184 (FIG. 2) of each pixel 150 in the row 147. The row 147 of pixels 150 is representative of many rows 147 of pixels 150 in the array 110 (similar to FIG. 1) though only one row 147 of pixels 150 is shown. Each row 147 of pixels 150 has an associated power supply circuit 690. The pixel 150 is shielded from incident light.

Within the power supply circuit 690, line 695 is mutually coupled to a first source/drain of respective transistors 692, 694. The other source/drain of transistor 692 is coupled to a Vaa voltage. The other source/drain of transistor 694 is coupled to ground. A signal line 697 is coupled to the gate of transistor 694 and inversely coupled to the gate of transistor 692; thus, only one of transistors 692, 694 is closed (i.e., conductive) at a time. Depending on the signal carried on line 697, line 695 is either coupled to Vaa or ground. For example, if the signal carried on line 697 is logic high, then transistor 692 is open and non-conductive, and transistor 694 is closed and conductive. Alternatively, if the signal carried on line 697 is logic low, then transistor 694 is open and non-conductive, and transistor 692 is closed and conductive. Therefore, power supply circuit 690 either provides a Vaa voltage to the row 147 of pixels 150, or connects row 147 to ground.

Figure 7:
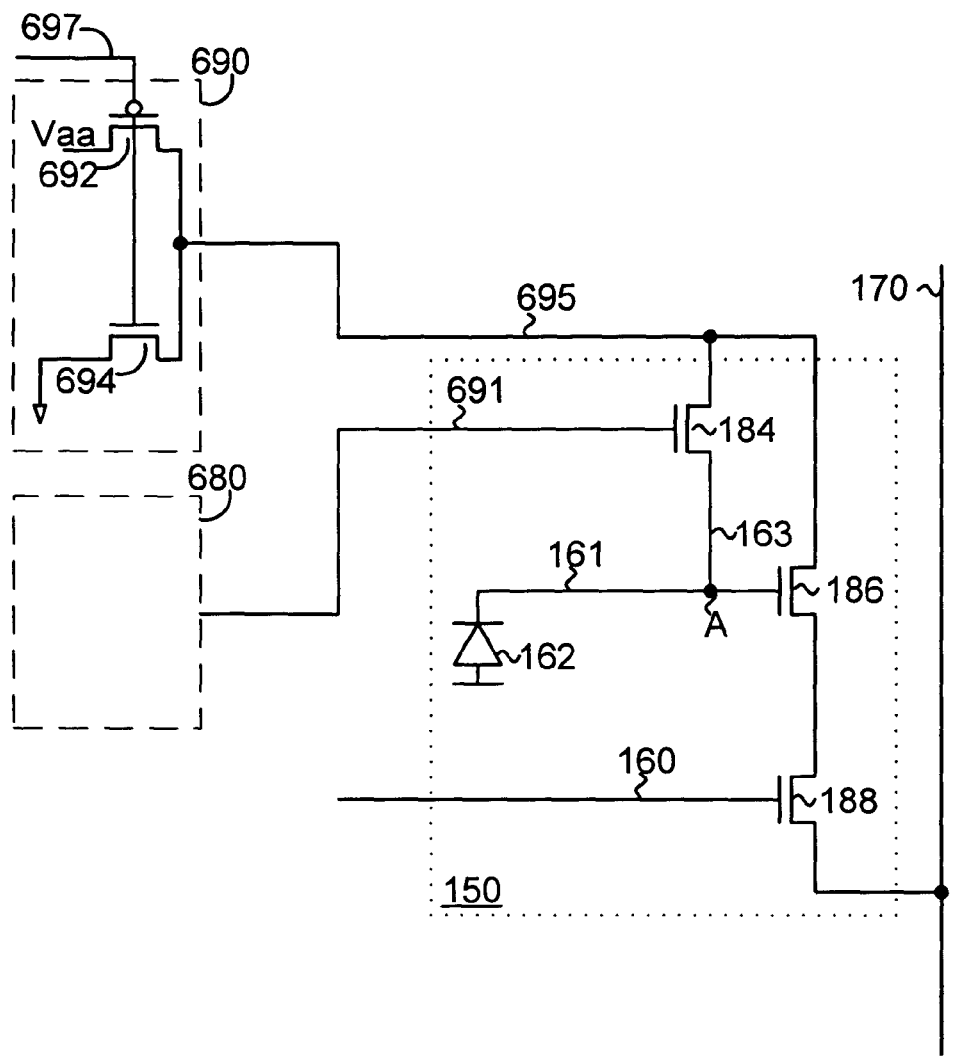
FIG. 7 is block diagram showing a portion of the FIG. 6 diagram in greater detail.

FIG. 7 is block diagram showing a portion of the FIG. 6 diagram in greater detail. FIG. 7 depicts pixel 150 being coupled to the power supply circuit 690. More specifically, power supply circuit 690 is coupled through line 695 to the reset transistor 184 and source follower transistor 186. FIG. 7, also depicts pixel 150 being coupled to the reset control circuit 690 through reset control line 695.

Figure 3:
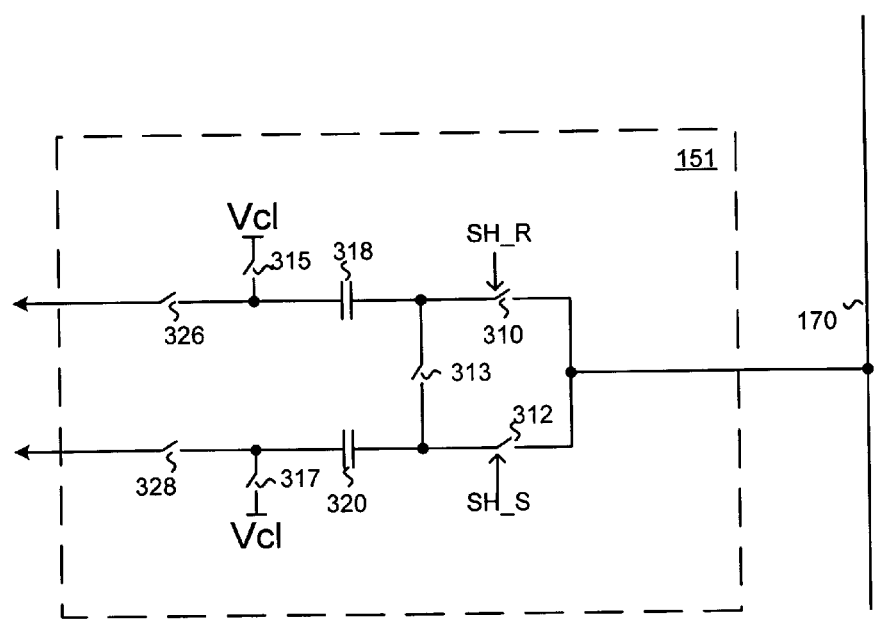
FIG. 3 is a block diagram of a conventional column buffer circuit of the FIG. 1 CMOS image array.
Figure 4:
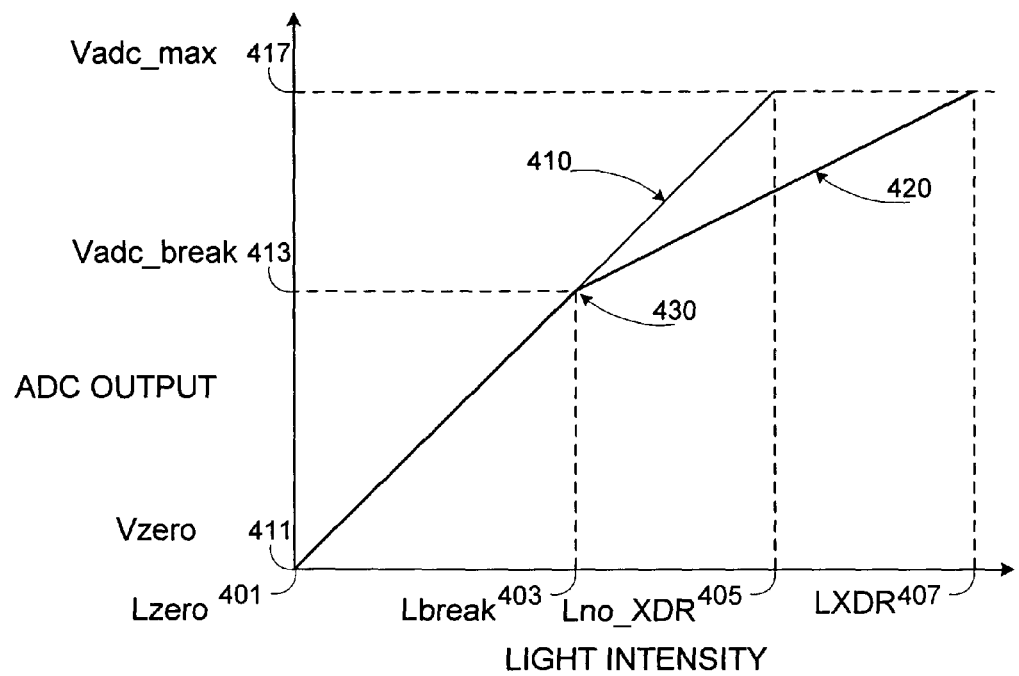
FIG. 4 is a graph depicting a conventional knee-point curve comparing Vadc with light intensity.
Figure 5:
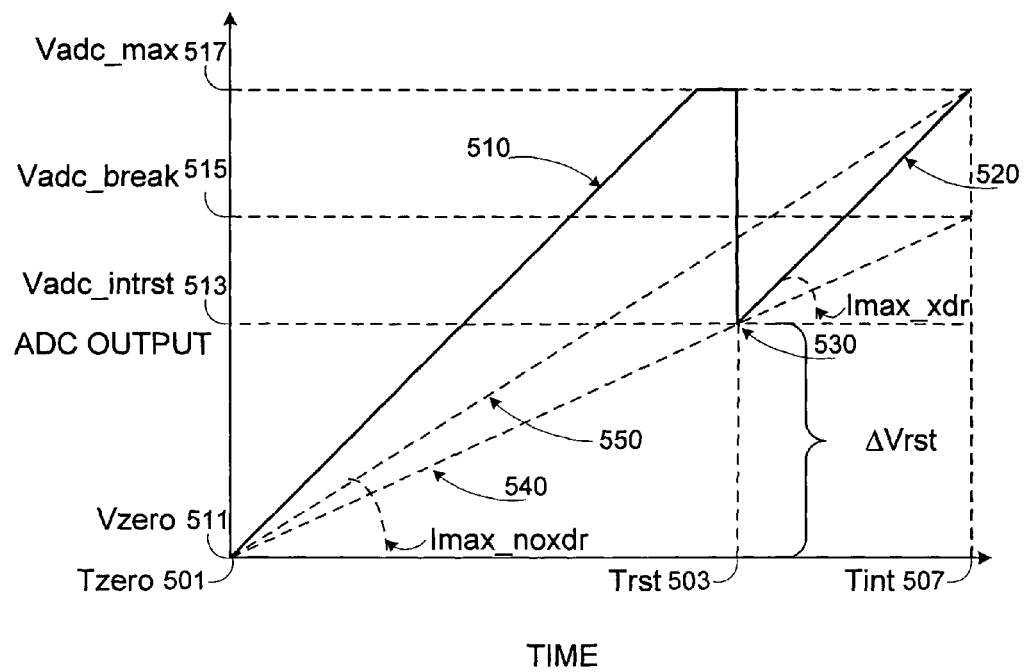
FIG. 5 is a graph depicting a conventional curve comparing Vadc over time.
Figure 8:
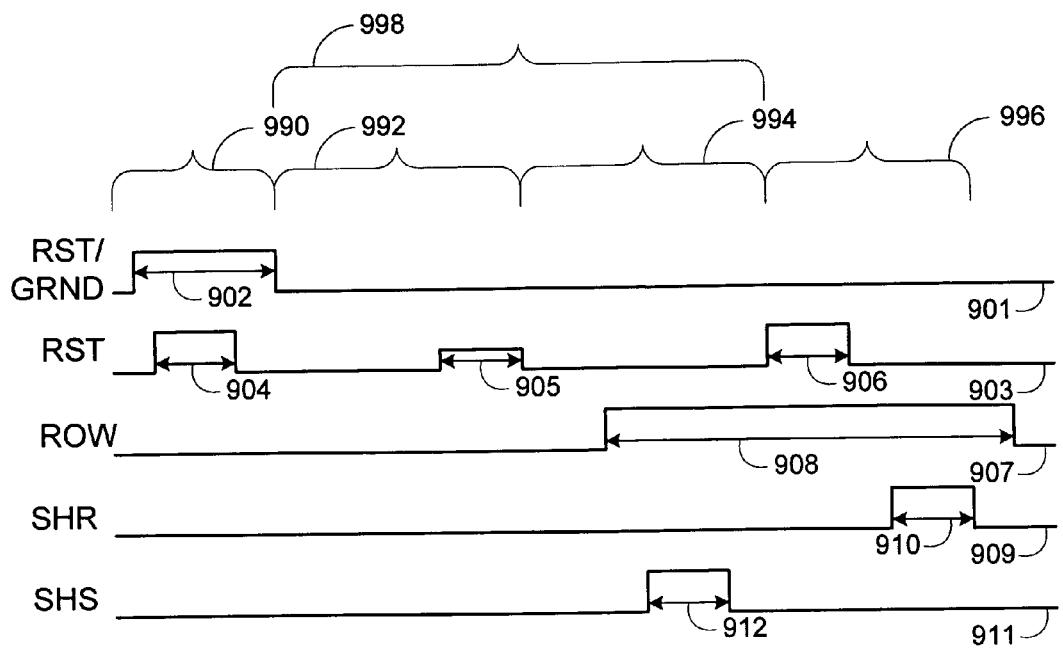
FIG. 8 is a simplified timing diagram associated with the operation of the circuitry of FIG. 6.

Turning to FIG. 8, the basic operation of the circuits of FIGS. 3, 6, and 7 is now described with reference to sampling and storing a set of signals from a pixel 150, where the two signals that are applied are the full reset value and the intermediate reset value. With reference to FIGS. 3, 6, and 7, the control signals are shown over defined time intervals 990, 992, 994, and 996.

The first time interval 990 is a flood time interval. During time interval 990, the light sensitive node of pixel 150 is coupled to ground, thereby flooding pixel 150 with a negative charge to force saturation, e.g., removing any stored signal from the pixel 150. The second time interval 992 is a Trst time interval. During Trst interval 992, the intermediate reset signal is provided to the pixel 150, a corresponding voltage is coupled to the pixel 150, and the pixel 150 is reset with respect to the intermediate reset value. The third time interval 994 is a Tint2 time interval. During the Tint2 time interval 994, the voltage value stored at node A (FIG. 7) is sampled and stored in capacitor 320 of column circuit buffer 151 (FIG. 3). The combined time intervals 992 and 994 comprise the Tint time interval 998. The fourth time interval 996 is a post-Tint time interval. During post Tint time interval 996, a full value reset signal is provided to the pixel 150 and a corresponding voltage is coupled to the pixel 150, and the pixel 150 is charged with respect to the full reset value. Also, during the post Tint time interval 996, the voltage value stored at node A (FIG. 7) is sampled and stored in capacitor 318 of column circuit buffer 151 (FIG. 3).

Throughout FIG. 8. a logic high signal indicates that the corresponding transistor of FIGS. 3, 6, and 7 is closed (conductive), while a logic low signal indicates that the corresponding transistor of FIGS. 3, 6, and 7 is open (non-conductive).

RST/GRND signal 901 corresponds to the logic level of transistor 694 and the inverse logic level of transistor 692 in power supply circuit 690 (FIG. 6). RST signal 903 corresponds to the logic level of reset transistor 184 in pixel 150 (FIG. 7). ROW signal 907 corresponds to the logic level of row select transistor 188 in pixel 150 (FIG. 7). SHR signal 909 corresponds to the logic level of sampling switch 312 in column buffer circuit 151 (FIG. 3). SHS signal 911 corresponds to the logic level of sampling switch 310 in column buffer circuit 151 (FIG. 3).

During time interval 902, transistor 692 opens and transistor 694 closes to couple line 695 to ground. During a time interval 904, transistor 184 is provided a full reset value and is closed to couple pixel 150 to ground; thereby, flooding pixel 150 with a negative charge. Time interval 902 begins before time interval 904 begins, and time interval 902 ends after time interval 904 ends. After time interval 902 ends transistor 692 is closed and transistor 694 opens to couple line 695 to Vaa.

During time interval 905, transistor 184 is provided an intermediate reset value and partially closes to couple pixel 150 to Vaa through line 695; thereby, providing an intermediate Vaa voltage to pixel 150. During time interval 908, row transistor 188 closes to couple node A of pixel 150 to column buffer circuit 151 through column line 170. Time 908 begins before the earlier of either time intervals 910, 912 begins, and ends after the later of time intervals 910, 912 ends. Time interval 908 begins after time interval 905 ends.

During time interval 912 sampling switch 312 closes, coupling pixel 150 through line 170 to charge capacitor 320 with the value stored in pixel 150. Time interval 912 begins after time interval 908 begins and ends before time interval 906 begins. During time interval 906, transistor 184 is provided a full reset value and closes to couple pixel 150 to Vaa through line 695, thereby providing a full Vaa voltage to pixel 150. Time interval 906 begins after time interval 912 ends and ends before time interval 910 begins.

During time interval 910, sampling switch 310 closes, coupling pixel 150 through line 170 to charge capacitor 318 with the value stored in pixel 150; where the value stored in pixel 150 is substantially equivalent to the full reset value. Time interval 910 begins after time interval 906 ends and ends before time interval 908 ends. Thus, the set of signals, i.e., the intermediate reset value and the full reset value, from the pixel 150 are stored in the column buffer 151. (FIG. 3)

After the set of signals are stored in the column buffer circuit 151, they are provided to the differential amplifier 154, which in turn, provides the outputted, differentiated signals to the ADC amplifier 156. (FIG. 6) The ADC amplifier 156 then provides an output voltage signal. The output voltage signal represents the difference between the provided full reset voltage and the provided intermediate reset voltage. Given that voltage at the break point is related to the integration time of the pixel and the difference between the full reset voltage and the intermediate reset voltage, the voltage at the break point is computed as:

$$\begin{aligned}Vbreakpoint &= Vadc\_break \quad (2)\\ &= (\text{Integration time}/\text{Break point time}) * (\text{the difference}\\ &\quad \text{between the full reset voltage and the intermediate}\\ &\quad \text{reset voltage})\\ &= (Tint/Trst) * \Delta Vrst\end{aligned}$$

Since Tint and Trst are known and ΔVrst is provided by the ADC amplifier, the kneepoint can be determined.

In another aspect of the present invention, pixel 150 is located in a redundant area of the array 110.

Figure 9:
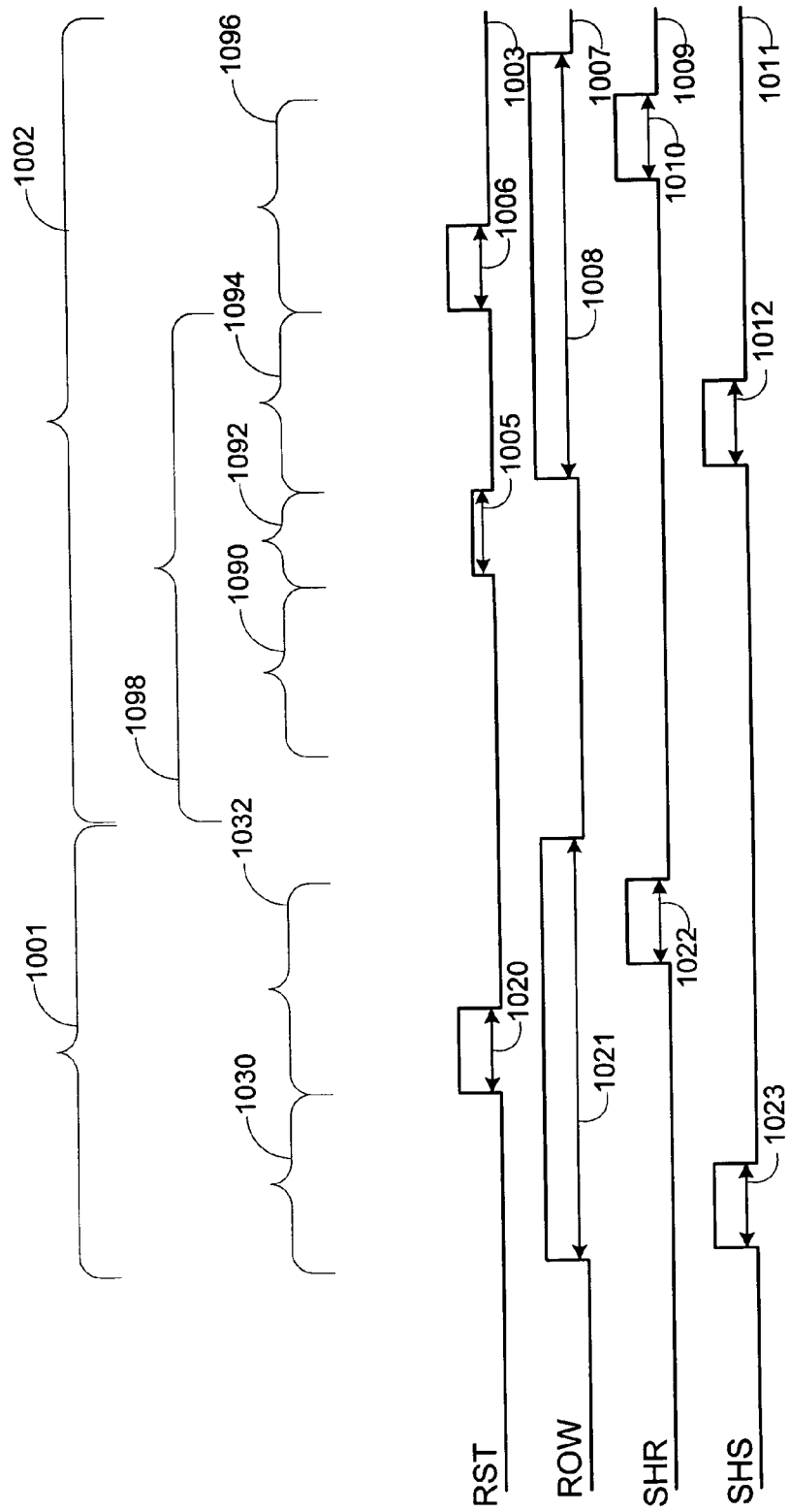
FIG. 9 is a simplified timing diagram associated with the operation of the circuitry of FIG. 1 in accordance with another exemplary embodiment of the invention.

In another exemplary embodiment of the present invention, the intermediate reset voltage is determined by using conventional circuitry and changing the intermediate reset time, and without the need for special light-opaque pixels and power supply circuit. FIG. 9 is a timing diagram that depicts the operation of circuit 100 according to this embodiment of the invention. The timing diagram of FIG. 9 differs from the timing diagram of FIG. 8 in several respects. First, the circuit 100 in the timing diagram of FIG. 9, the image array 110 is read in two segments, first without the XDR technique enabled during time period 1001, and second with the XDR technique enabled during time period 1002. Second, circuit 100 does not have a power supply circuit 690, and therefore no control signals are provided for that circuit. Third, the time when the intermediate reset voltage is provided during the XDR technique, e.g., Trst, is substantially close to the time of the integration, e.g., Tint.

Figure 10:
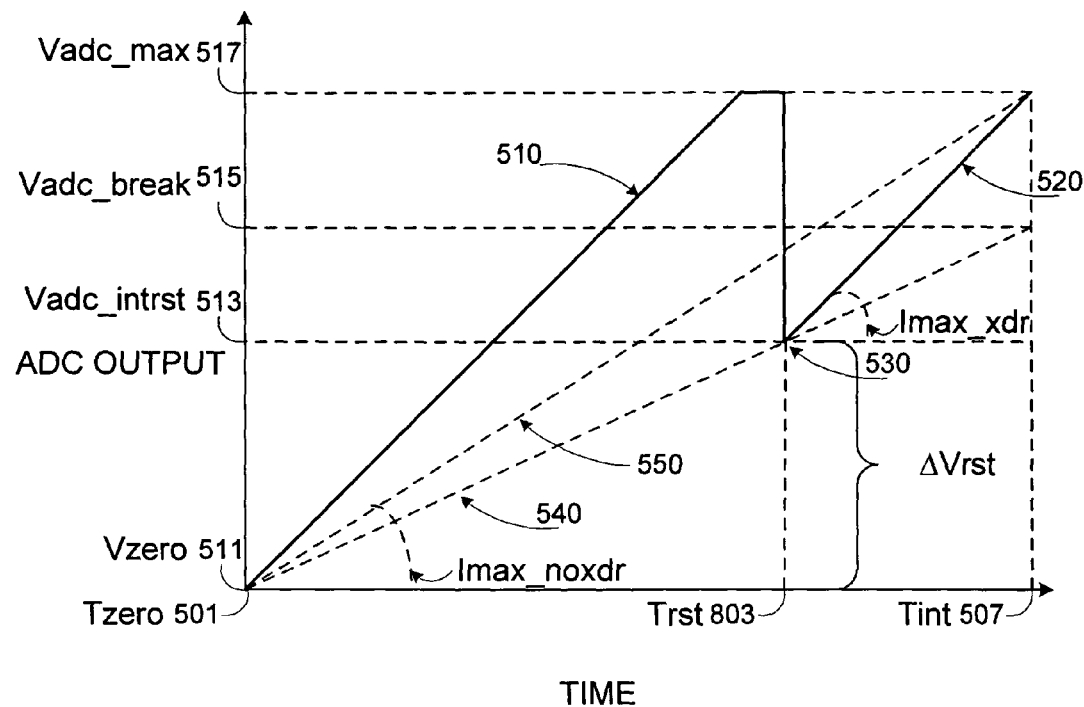
FIG. 10 is a graph depicting a knee-point curve comparing Vadc over time in accordance with a second embodiment of the invention.

The second segment 1002 of the readout from the image array is depicted in FIG. 10 where the knee-point curve is shown comparing Vadc over time. As seen in FIG. 10, Trst 803 is closer to Tint 507 so that the difference between Trst 803 and Tint 507 is minimized.

As indicated above, in this exemplary embodiment of the invention, the kneepoint is determined using a two-step process. In the first step of the process, an XDR technique is disabled and not employed, and the CMOS image array 100 (FIG. 1) is read in the conventional fashion and processed. The values, and possibly locations, of saturated pixels are recorded. For example, a pixel indicates a measured light intensity, after being processed by an ADC amplifier on a graduated scale from 0 to 1,023, where 1,023 is a saturated pixel. Then, a pixel having a measured light intensity level close in value to 1,023 is recorded, e.g., for example, those pixels having a measured light intensity level greater than 1,018. If the measurement of the pixels indicates that there are no pixels that are saturated, then the exposure is adjusted to force a number of pixels to have a value indicating that they are saturated.

In the second step of the process during time period 1002 (FIG. 9), the image array is read out again. During this readout, an XDR technique is enabled. As indicated above in this exemplary embodiment, the Trst occurs just briefly before Tint. In a preferred embodiment, the Trst is substantially equal to Tint. The values are read from the pixels of the array and processed. The post-ADC processed signals taken in the second step of the process that correspond to the pixels identified in the first step of the process as saturated pixels in the first are compared to determined the difference in voltage output from these pixels in the first and second step of the process. The result of the comparison provides the ΔVrst. As described above with respect to Equation (2), once ΔVrst is determined, then Vadc_break can be calculated.

Figure 11:
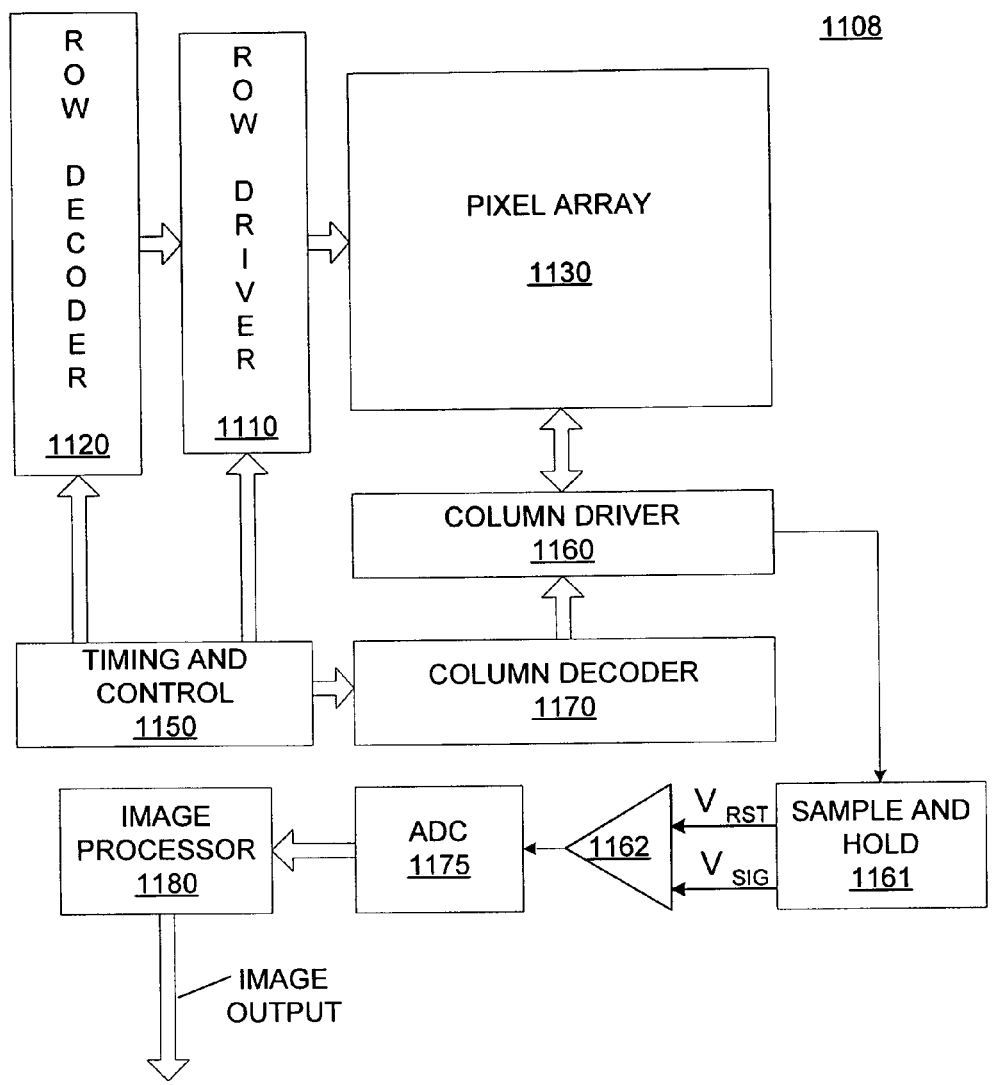
FIG. 11 is a block diagram representation of an imaging device in accordance with an exemplary embodiment of the invention.

FIG. 11 illustrates a block diagram of an exemplary imager device 1108 that may be used in accordance with an embodiment of the invention. Imager 1108 has a pixel array 1100 and row lines are selectively activated by a row driver 1110 in response to row address decoder 1120. A column driver 1160 and column address decoder 1170 are also included. The imager device 1108 is operated by the timing and control circuit 1150, which controls address decoders 1120, 1170. The control circuit 1150 also controls the row and column driver circuitry 1110, 1160. A sample and hold circuit 1161 associated with the column driver 1160 reads a pixel reset signal ($V_{rst}$) and a pixel image signal ($V_{sig}$) for the selected pixels. A differential signal ($V_{rst}-V_{sig}$) is produced by differential amplifier 1162 for each pixel. The differential signal is digitized by analog-to-digital converter 1175 (ADC). The analog-to-digital converter 1175 supplies the digitized pixel signals to an image processor 1180, which forms and outputs a digital image.

Figure 12:
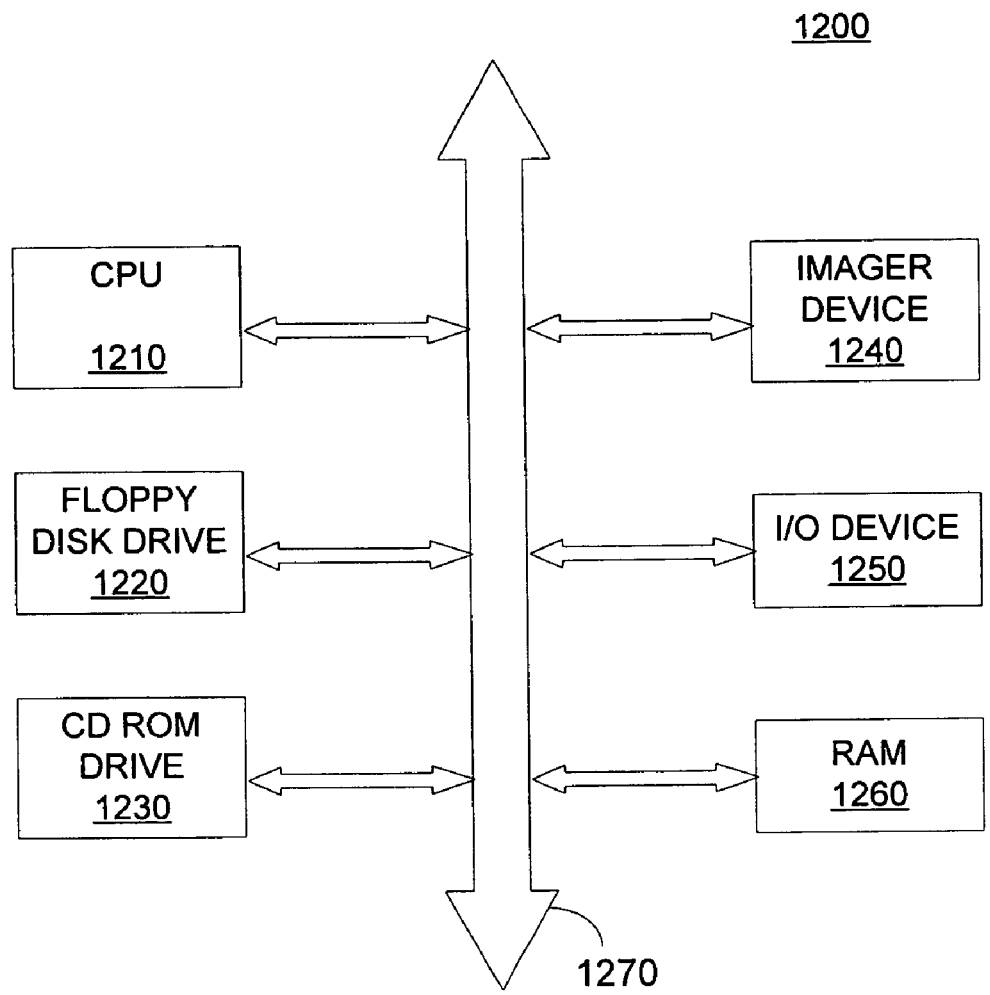
FIG. 12 is a block diagram representation of a processor-based system incorporating an imaging device in accordance with an exemplary embodiment of the invention.

The method and apparatus aspects of the invention are embodied in an imager device 1240 shown in FIG. 12, which provides an image output signal. The imager device 1240 may be, for example, the imager device 1108 of FIG. 11. The image output signal can also be applied to a processor system 1200, also illustrated in FIG. 12. A processor based system, such as a computer system, for example, generally comprises a central processing unit (CPU) 1210, for example, a microprocessor, that communicates with one or more input/output (I/O) devices 1250 over a bus 1270. The CPU 1210 also exchanges data with random access memory (RAM) 1260 over bus 1270, typically through a memory controller. The processor system may also include peripheral devices such as a floppy disk drive 1220 and a compact disk (CD) ROM drive 1230 which also communicate with CPU 1210 over the bus 1270. Imager device 1240 is coupled to the processor system and includes a pixel storage and readout circuit as described along with respect to FIG. 6.

While the invention has been described and illustrated with reference to specific exemplary embodiments, it should be understood that many modifications and substitutions can be made without departing from the spirit and scope of the invention. For example, although described with reference to a 3T pixel, the invention is not so limited. Further, although described with reference to CMOS active pixel arrays the invention is not so limited. Accordingly, the invention is not to be considered as limited by the foregoing description but is only limited by the scope of the claims.

What is claimed as new and desired to be protected by Letters Patent of the United States is:

1. An image array pixel comprising:
   a charge sharing node;
   a photosensor coupled to said charge storing node;
   a controllable voltage source for supplying one of a first and second voltage level; said first voltage level being higher than said second voltage level;
   a reset transistor having source/drain regions on opposite sides of a gate, one of said source/drain regions being switchably coupled to an output of said controllable voltage source first and second voltage sources for providing first and second voltages, respectively, the other of said source/drain regions being coupled to said charge storing node;
   a reset control circuit coupled to a gate of said reset transistor, said reset control circuit for selectively providing a first reset control signal at a first level and a second reset control signal at a second level, said first level being higher than said second level,
   said reset control circuit and controllable voltage source being controllable during first, second, and third time intervals such that:
   during said second time interval, said reset control circuit supplies said second reset control signal to said gate of said reset transistor while said controllable voltage source provides said second voltage to operate said reset transistor to partially remove charges from said photosensor,
   during said third time interval, said reset control circuit supplies said first reset control signal to said gate of said reset transistor, said controllable voltage source provides said first voltage to substantially remove all charges from said photosensor.

2. The pixel of claim 1, wherein said first voltage is higher than said second voltage wherein said reset control circuit and controllable voltage source are further controllable such that:
   during said first time interval, said reset control circuit supplies said first reset control signal to said gate of said reset transistor while said controllable voltage source provides said second voltage to operate said reset transistor to store charges at said photosensor.

3. The pixel of claim 2 further comprising
   a differential amplifier configured to provide correlated double sampling of a first signal read from said charge storing region after said second time interval and a second signal read from said charge storing node after said third time interval.

4. The pixel of claim 1, wherein said second voltage is a ground potential.

5. The pixel of claim 1, wherein said pixel does not receive any light.

6. An imaging device, comprising:
   a processor;
   an imager array coupled to said processor, one pixel of said image array comprising:
   a charge sharing node;
   a reset control circuit configured to provide a plurality of non-zero voltages;
   a row select transistor being switchably coupled to a first and second voltage, a gate of said row select transistor being coupled to a row select control line; and
   a reset transistor having source/drain regions on opposite sides of a gate, one of said source/drain regions being switchably coupled to said first and second voltage, the other of said source/drain regions being coupled to said node, a gate of reset transistor being coupled to said reset control circuit.

7. The imaging device of claim 6, wherein said first voltage is higher than said second voltage.

8. The imaging device of claim 7, wherein said second voltage is a ground potential.

9. The imaging device of claim 6, wherein said one of said source/drain regions is coupled to only one of said first and second voltages at a time.

10. An imager circuit comprising:
a controllable voltage source for selectively supplying one of a first lower voltage level and a second higher voltage level to a voltage supply line;
a pixel comprising:
  a charge storage node;
  a photosensor coupled to said storage node;
  a reset transistor coupled between said voltage supply line and said storage node, said reset transistor having a gate input; and
a control circuit for providing control signals to said controlable voltage source and gate of said reset transistor, said control circuit configured such that:
during a first time period, said reset transistor is supplied with a gate control signal at a first level while said controllable voltage source supplies said second higher voltage level to said voltage supply line,
during a second time period, said reset transistor is supplied with a gate control signal at a second level lower than said first level but above a threshold voltage of said reset transistor while said controllable voltage source supplies said second higher voltage level to said voltage supply line.

11. The imager circuit of claim 10, where said control circuit further configured such that:
during a third time period, said reset transistor is supplied with a gate control signal at a third level being substantially logic level zero to deactivate said reset transistor.

12. The imager circuit of claim 11, where said control circuit further configured such that:
during a fourth time period, said reset transistor is supplied with a gate control signal at said first level while said controllable voltage source supplies said first lower voltage level to said voltage supply line.

13. The imager of claim 12, further comprising:
a sample and hold circuit selectively coupled to said pixel being controllable such that during a time interval between said first time period and said second time period, said sample and hold circuit is coupled to said charge storage node to store a first stored value,
said sample and hold circuit being controllable such that during a time interval after said second time period, said sample and hold is coupled to said charge storage node to store a second stored value.

14. A pixel array comprising:
at least one pixel circuit comprising:
a storage node for storing charges;
a reset transistor for controlling the charges stored at said storage node;
a circuit for operating said reset transistor to fill the storage node with electrons, to partially remove electrons from said storage node, and to substantially remove all charges from said storage node; and
a readout circuit for providing a first signal representing charges at said storage node after electrons are partially removed from said storage node and a second signal representing charges at said storage node after all charges are removed from said storage node.

15. The pixel array of claim 14 further comprising:
a comparison circuit coupled to said readout circuit for comparing said first signal with said second signal to determine a knee point response characteristic of said pixel circuit.

16. The pixel array of claim 15 wherein said comparison circuit further comprises:
an analog-to-digital converter coupled to said readout circuit.

17. The pixel array of claim 16 wherein said comparison circuit further comprises a differential amplifier circuit, wherein said comparison circuit compares said first signal with said second signal by having said first and second signals being first and second inputs to said differential amplifier circuit.

18. The pixel array of claim 17 wherein said comparison circuit comparison compares said first signal with said second signal after said first and second signals are processed by said analog-to-digital converter.

19. A pixel comprising:
a first voltage source having an output switchable between a first and second reset supply voltage in response to a first control signal;
a charge storage region;
a reset transistor connected between said first voltage source and said charge storage region; and
a control circuit for providing a gate control voltage to a gate of said reset transistor, said control circuit selectively providing a first operating control voltage and a second operating control voltage to said reset transistor, said second operating control voltage being less than said first operating control voltage and higher than a zero voltage.

20. The pixel of claim 19, wherein said first voltage source and said control circuit are configured to operate said reset transistor such that a first reset supply voltage is provided at said charge storage region when said first reset supply voltage and said second operating control voltage are provided to said reset transistor and
a second reset voltage is provided at said charge storage region when said first supply voltage and said first operating control voltage are provided to said reset transistor.

21. The pixel of claim 20, wherein said first voltage source and said control circuit are configured to operate said reset transistor such that said charge storage region has a third voltage when said second reset supply voltage and said first operating control voltage are supplied to said reset transistor.

22. An image array pixel comprising:
a charge storing node;
a photosensor coupled to said charge storing node;
a voltage source;
a reset transistor having source/drain regions on opposite sides of a gate, one of said source/drain regions being coupled to an output of said voltage source the other of said source/drain regions being coupled to said charge storing node;
a sample and hold circuit having first and second storage areas selectively coupled to said charge storing node; and
a control circuit for operating said reset transistor and said sample and hold circuit for providing a correlated double sampling and holding of a charge integrated signal and a full reset signal during a one sample and hold period and for providing a sampling and holding of a first full reset signal with said reset transistor receiving a first gate control signal and a second less than full reset signal with said reset transistor receiving a second gate control signal which is lower than said first gate control signal during a second sample and hold period.

23. The pixel of claim 22, wherein said pixel being controllable during first, second, third, fourth, and fifth time intervals such that:
during said first time interval, reading out a signal from said charge storing node and storing it in said first storage area of said sample and hold circuit;

during said second time interval, sampling and holding a signal in said second storage area of said sample and hold circuit from said charge storing node after a first full reset signal with said reset transistor receiving said first gate control signal;

during said third time interval, said reset transistor receiving a second gate control signal;

during said fourth time interval, reading out a signal from said charge storing node and storing it in said first storage area of said sample and hold circuit;

during said fifth time interval, sampling and holding a signal in said second storage area of said sample and hold circuit from said charge storing node after a first full reset signal with said reset transistor receiving said first gate control signal.

24. The pixel of claim 22, wherein said third time interval occurs close in time to said fourth time interval.

25. An image array comprising:

a controllable voltage source being selectively mutually exclusively coupled to a first voltage source and a second voltage source for supplying a first and a second voltage level, respectively, said first voltage level being different from said second voltage level;

a pixel comprising:

a reset transistor having source/drain regions on opposite sides of a gate, one of said source/drain regions being switchably coupled to an output of said controllable voltage source, the other of said source/drain regions being coupled to an associated charge storing node; and a reset control circuit coupled to a gate of said reset transistor, said reset control circuit configured to provide a first reset control signal at a first level, a second reset control signal at a second level, and a third reset control signal at a third level; where said first level is different from said second and third levels, where said second level is different from said third level.

* * * * *